Figure 4:
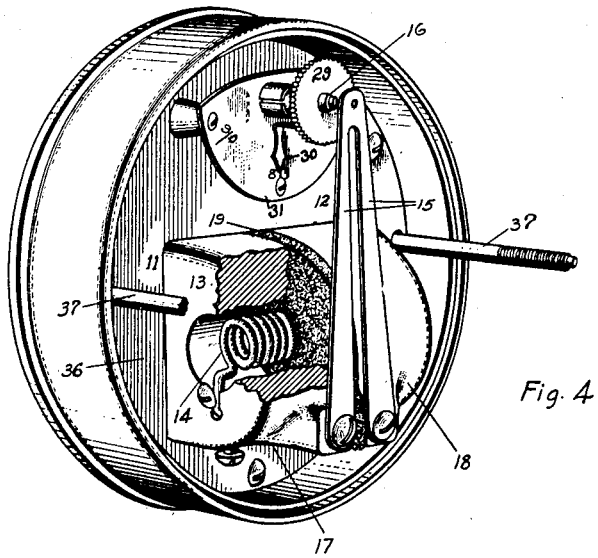

July 8, 1924.
C. I. HALL
PROTECTIVE DEVICE
Filed Nov. 28, 1919
1,501,017
2 Sheets-Sheet 1
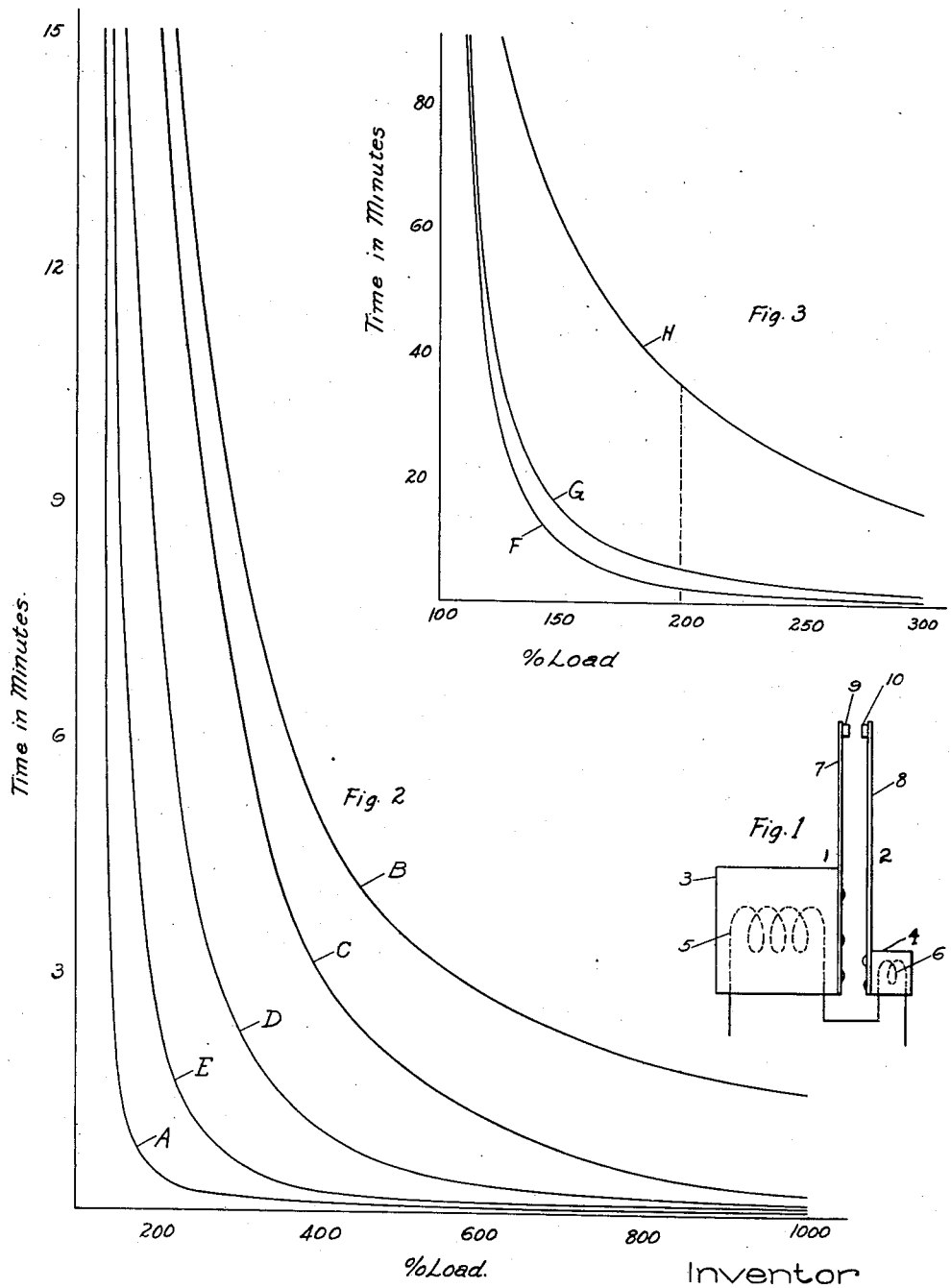
Inventor
Chester I. Hall,
by *[signature]*
His Attorney July 8, 1924.

C. I. HALL 1,501,017

PROTECTIVE DEVICE

Filed Nov. 28, 1919

2 Sheets-Sheet 2

Inventor:
Chester I. Hall,
by *Albert E. Davis*
His Attorney.

Patented July 8, 1924.

1,501,017

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

PROTECTIVE DEVICE.

Application filed November 28, 1919. Serial No. 340,969.

*To all whom it may concern:*

Be it known that I, CHESTER I. HALL, a citizen of the United States, residing at Fort Wayne, county of Allen, State of Indiana, have invented certain new and useful Improvements in Protective Devices, of which the following is a specification.

My invention relates to protective devices, particularly to devices of the thermal type and has for its object, to provide a thermal protective device which is adapted to prevent overheating of electrical apparatus and which, in particulars to be more definitely pointed out hereinafter, is a distinct improvement, both in structure and function, on devices of this general type heretofore known in the art.

Various protective devices of the thermal type have been suggested and used to prevent overheating of electrical apparatus, particularly dynamo electric machines but few, if any, have provided requisite protection, except in a very limited degree. This has been due, not only to the lack of appreciation of the thermal characteristics of the apparatus to be protected and the fundamental causes of overheating but also to the lack of appreciation of how to duplicate the thermal characteristics of the apparatus, in the device providing the thermal protection.

All electrical apparatus, such as dynamo electric machines, transformers and the like may be considered as comprising a conductor element, through which current passes, a mass or magnetic element surrounding the conductor element and insulation between the mass and conductor element. As is well known, the operation of such apparatus is always accompanied by the development of heat and the more power which such apparatus delivers or the more load which is carried, the greater the heating becomes and the higher the temperature in the apparatus. The temperature which can be produced in the apparatus is limited by that temperature which the insulation can withstand without impairing its insulating properties, so that the load capacity of the apparatus is essentially a function of temperature. As the heating effect to a critical temperature is largely the limiting factor in the operation of electrical apparatus of the character described, it is obvious that the only effective way of protecting such apparatus is by means of a protective device of essentially the same thermal operating characteristics as the apparatus to be protected.

The critical temperature for electrical apparatus such as dynamo electric machines, for instance, has been found, from actual test data, to depend on the development of a hot spot or a point in the machine where the temperature exceeds that of other points. When the temperature of the hot spot in certain classes of machines rises 50° C. above ambient or room temperature, the American Institute of Electrical Engineers have determined, that the critical temperature has been reached. Ambient temperature is specified by the institute as 40° C. so that the critical temperature of operation in this case is an ultimate hot spot temperature of 90° C. As improvements are made in the character of the insulation surrounding the conductors, a rise in hot spot temperature of 55 or 60° C. above the ambient temperature, may be permitted.

The heating of the conductors in the apparatus to be protected occurs directly by currents traversing the same and is an $I^2R$ heating effect. The heating of the mass of metal surrounding the conductors, occurs by conduction of the heat developed in the conductors and also by the effect of hysteresis or eddy current losses in the mass. The mass of material surrounding the conductors including iron, laminations, frame, etc., I will henceforth designate, for purposes of description, as the frame of the machine. It is well known that the hot spot may develop in either the conductors or frame of the machine and may vary in location in the same machine between conductors and frame under varying conditions of load. It is, therefore, evident that any thermal protective device dependent to protect from overheating in response to thermal variations in the conductors alone or in the frame alone, is inadequate to protect such machines.

If an electrical apparatus, such as a dynamo electric machine is subjected to a small overload, a certain time will be required for the hot spot of the machine to reach a critical temperature of 90° C. for instance. As the amount of overload is increased, the time required for the hot spot to reach a critical temperature taken from the same ambient temperature, becomes correspondingly less so that a time-load curve is obtained having a logarithmic form. The protective device of my invention is constructed to duplicate this hot spot temperature curve for any electrical apparatus to be protected and cause the opening of the circuit of such apparatus in a time equal to that required for the hot spot of the apparatus to reach critical temperature. This problem has been recognized by those skilled in the art for some time and various devices have been proposed to accomplish a similar result. Such devices as constructed, have constituted, however, only thermally lagged relays without containing the elements vitally necessary for the production of a thermal characteristic, coincident with that of the apparatus to be protected.

By the construction of my device, however, I am able to duplicate the thermal characteristics of the apparatus to be protected, throughout the entire range of overload or upon any current condition which can exist. The protective device in accordance with the invention may be located remotely from the apparatus to be protected so as to be out of the direct influence of the heat radiated from the apparatus. For accomplishing this function, I provide two elements responsive to the same current which traverses the apparatus to be protected or a proportional part of this current, one element requiring a materially longer time delay to reach critical temperature than the other element, on the same value of overload. I then so proportion the effect of these elements that the time delay resulting from their interaction duplicates that of the machine to be protected. Thus, I provide a means for duplicating widely divergent thermal characteristic curves by simply varying the proportional effect of each element without changing the structural design thereof, as was heretofore necessary.

On comparatively small overloads, the heat generated in the conductors is thermally conducted to the frame of the machine, raising its temperature and that of the conductors slowly, whereas upon excessive overloads, the heat is generated so rapidly in the conductors that they reach the critical temperature very quickly and before any appreciable amount of heat is conducted to the frame of the machine. On comparatively small overloads, therefore, requiring considerable time for the hot spot to reach critical temperature, the effect of the element of my device having that longer time delay predominates, whereas upon excessive overloads, such as short circuits, the effect of that element having the shorter time delay predominates to effect the opening of the circuit of the machine. As upon excessive overloads, the thermal characteristics of the conductors are more or less independent of the characteristics of the frame of the machine, correspondingly under these conditions, the element of my device having the shorter time delay is operative more or less independently of the other element of my device.

The elements comprising my device are also arranged to be directly affected by changes in ambient temperature, in the same manner as the machine itself, so that the resultant temperature of the device is not only proportional to the hot spot temperature of the machine but is exactly equal to this temperature. When the load on a machine is of the fluctuating character, it is particularly important that the cooling characteristics of the protective device duplicate those of the machine. I accomplish this function by proper regulation of the rate of radiation from the thermal elements. It is hereinafter understood that by the use of the term thermal characteristics that I intend to mean both heating and cooling characteristics.

The novel features which I believe to be characteristic of my invention will be definitely indicated in the claims appended hereto while the features of construction and mode of operation will be understood by reference to the following description taken in connection with the accompanying drawings which show the preferred embodiments of my invention and in which—

Figure 5:
Figure 6:
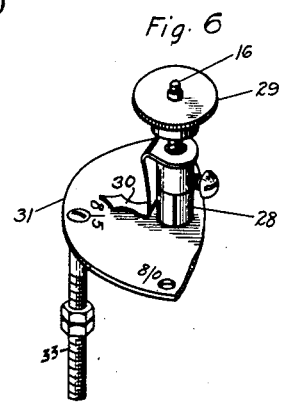

Fig. 1 is a diagrammatic view, by way of illustration, of a protective device embodying the principles of my invention, Fig. 2 shows graphically, the thermal characteristics of my device under various conditions of adjustment, Fig. 3 illustrates graphically the thermal characteristics of various electrical apparatus to be protected, Fig. 4 shows, in perspective, the preferred embodiment of my device with a portion broken away for the purposes of clearness, Fig. 5 is a perspective view of the elements comprising the device of Fig. 4 showing their connections to an electrical apparatus to be protected and Fig. 6 is a perspective view of a detail of the device of Fig. 4.

In Fig. 1 I have shown an illustration embodying the principles of the thermal protective device of my invention and comprising two elements 1 and 2 having heat storage masses 3 and 4 respectively, heating means 5 and 6 respectively and thermal responsive members 7 and 8 respectively. The thermal responsive members 7 and 8 are in thermal conductive relation with the heat storage masses 3 and 4 respectively and serve as temperature indicating means for the two elements. For this purpose, the thermal members 7 and 8 are made of thermostatic metal, preferably in the form of bimetallic strips which are fixed at one end to their respective heat storage masses 3 and 4. The opposite ends of the members 7 and 8 carry cooperating contact members 9 and 10 which are arranged to move toward each other into engagement, in response to the flexing of the members 7 and 8. The heating means 5 and 6 are in series and are adapted to be connected in series with the circuit of the apparatus to be protected or connected to receive a proportional part of such current. The mass 3 of element 1 is considerably greater than mass 4 of element 2 so that the time required to heat mass 3 to a predetermined temperature requires a considerably longer time delay than that required to heat mass 4 to the same temperature. Element 1 is, therefore, operative with a long time delay and element 2 is operative with a much shorter time delay.

The thermal characteristic curve for element 1 is shown by curve B of Fig. 2. This curve shows the time required for this element of my device to reach a critical temperature of 90° C. for instance, under various load values. The thermal characteristics of element 2 of my device, under the same conditions, is shown by curve A of Fig. 2. These two curves are obtained with some predetermined thermal storage volume for each element. By the term thermal storage volume, I mean the ratio of the mass times its specific heat, to the radiating surface of the mass. According to this term, element 1 has a much larger thermal storage volume as compared with element 2 and, due to this fact, element 1 heats up more slowly. With these two predetermined thermal storage volumes, element 1 has a time delay greater than that of the apparatus it is designed to protect, while element 2 has a shorter time delay than such apparatus, so that the thermal characteristics of the electrical apparatus to be protected will lie between the two curves A and B. I am able, therefore, to duplicate the thermal characteristics of any apparatus having a thermal characteristic curve lying between curves A and B, by properly proportioning the effect of elements 1 and 2 to obtain a resultant effect duplicating such a curve.

This resultant effect is obtained with the same device without changing the structural design of either element but by merely changing the ratio of the resistances of the two heating means 5 and 6, that is, by changing the ratio of heat inputs, to the heat storage masses 3 and 4, so that the time required for the contacts 9 and 10 to move into engagement is longer or shorter depending on whether the effect of element 1 or 2 predominates. To accomplish this result, I may change the resistance of either or both the heating means 5 or 6. In curve C of Fig. 2, I have shown the resultant thermal characteristics of my device having the resistance of the heating coils 5 and 6 in the ratio of 30 to 1, while in curve D, the resistance of the heating coils are in the ratio of 12 to 1, and in curve E in the ratio of 5 to 1. It is, therefore, evident that with the proper ratio of the resistances of heating coils 5 and 6, that a resultant thermal characteristic curve can be obtained to duplicate any curve lying between the limits of curves A and B.

Let us assume the ratio of the resistances of heating coils 5 and 6 is 12 to 1, duplicating the thermal characteristic curve of a machine as shown by curve D. Upon a comparatively small overload, say 125%, heat storage mass 4 of element 2 heats up to the maximum temperature which it will attain, in a comparatively short time interval and by thermal conduction, the thermostatic member 8 is flexed to move its contact 10 towards contact 9 a proportionate distance. Heat storage mass 3 of element 1, due to its larger thermal storage volume, takes a considerable longer time to reach final temperature and thermostatic member 7 is slowly flexed to move its contact 9 toward contact 10 and finally into engagement with contact 10 to control, for instance, a tripping circuit of a switch controlling the circuit of the apparatus. The resultant time delay required for members 7 and 8 to move their contacts 9 and 10 into engagement is the same as that required for the hot spot of the apparatus to reach critical temperature. Under this condition of load, the slower time delay element predominates to determine the resultant time delay. Upon severe overloads such as caused by short circuits, the heat is developed so rapidly in the conductors of the machine that very little heat is conducted to the frame and the hot spot occurs in the conductors, necessitating a rapid opening of the circuit. In this case, the mass 4 of the short time delay element 2 of my device heats up at the same rate as the conductors and the thermostatic member 8 flexes to move its contact 10 directly into engagement with contact 9 before contact 9 has had time to move any appreciable distance. Thus the effect of element 2 predominates and under these excessive conditions, operates practically independently of the element 1.

For calibration, I subject the elements 1 and 2 of my device to the critical temperature of 90° C. and so space the thermostatic members 7 and 8 that they will just bring their contacts into engagement. This setting will correspond to a 50° machine, the insulation of which can withstand a 50° rise of temperature above an ambient temperature of 40° C. If the machine to be protected is a 40° machine corresponding to an 80° C. critical temperature, I decrease the distance through which the contacts have to move, so that upon 80° C. the contacts will have engaged. As the ambient temperature decreases, it requires a longer time for a machine to reach its critical temperature or it may carry a larger load before critical temperature is reached. This is taken care of automatically by my device, as the lower the ambient temperature, the more the thermostatic members 7 and 8 flex in a direction to increase the distance between contacts 9 and 10 thus requiring a larger load value and a longer time for them to be brought into engagement.

In Fig. 3, I have shown thermal characteristic curves for three different types of apparatus to be protected. Curve F is that of a dynamo electric machine of the induction motor type, curve G is that of a transformer and curve H is that of a dynamo electric machine of the rotary converter type. It will be noted that curves F and G fall within the limits of curves A and B of Fig. 2 and can be duplicated by the proper proportional effects of elements 1 and 2. As curve H on the other hand, has a longer time delay than element 1, in order to duplicate the thermal characteristics of this type of machine, the time delay of element 1 must be increased, which is obtained by increasing the thermal storage volume of this element. The thermal storage volume may be increased by simply heat insulating the heat storage mass, which amounts to decreasing the radiating surface, or if a still larger increase in thermal storage volume is required, then increasing the heat storage mass or by using a mass of higher specific heat. By obtaining a suitable thermal storage volume, the thermal characteristic curve for element 1 can be made such that curves of the type shown by curve H are between the modified curves corresponding to A and B in Fig. 2 and by then suitably proportioning the effects of elements 1 and 2, as before described, the curve desired can be duplicated. For machines having the thermal characteristics of curve H it may be also desirable, to raise curve A by increasing the thermal storage volume of element 2. In the case of rotary converters the amount of overload which can be carried is often limited by commutation difficulties. In such an instance, my protective device may provide thermal protection duplicating the thermal characteristics of the machine up to the point where commutation trouble begins, whereupon overloads in excess of this amount will operate an auxiliary device to open the circuit instantaneously. This operating characteristic is shown on the dotted line portion of curve H.

Instead of obtaining the resultant time delay by mechanical interrelation of the two elements 1 and 2, that is by combining the deflections of the two thermostatic members 7 and 8, I may obtain the same resultant time delay by a thermal interrelation of the elements. For obtaining this thermal relation, I maintain element 1 as shown in Fig. 1 and utilize the thermostatic member 7 of element 1 as the second or shorter time delay element of my device. The mass of this member 7 is made to duplicate that of mass 4 of element 2 and the resistance of member 7 duplicates that of heating means 6. Then connecting this member 7 so that it is, itself, traversed by the heating current, it will be proportionately flexed thereby serving both as an indicator of temperature and as a thermal storage volume. Thus, by properly proportioning the mass and resistance of the thermostatic member 7, it combines the functions of the mass 4, heating coil 6 and thermostatic element 8. The thermostatic member 7, therefore, not only acts by conduction to indicate the temperature of element 1 but by itself, acts at the same time, as element 2 of my device which is traversed by the same current which traverses heating coil 5 of element 1. I have combined, therefore, the thermal characteristics of element 2 in the thermostatic member of element 1. This modified arrangement of the elements of my protective device is the form which I prefer to use in the practical and commercial application of my invention.

This modified arrangement and the connections of the elements thereof in the circuit of the apparatus to be protected is shown in Figs. 4 and 5. In these figures, elements 11 and 12 correspond to elements 1 and 2 of Fig. 1, element 11 having a long time delay and element 12, a short time delay. Element 11, as before, comprises a heat storage mass 13, a heating means or coil 14, therefore, and a thermally responsive or bimetallic thermostatic element 15, thermally associated with mass 13. Element 12 of my device comprises the thermostatic member 15 which is arranged to be traversed by the same current which traverses heating coil 14 and in itself, combines the mass, heating means and thermal responsive means of element 2 of the device of Fig. 1. Thermostatic member 15, therefore, is actuated proportional to the resultant effect of both elements of my device by the thermal interrelation of the elements. This member is deflected an amount and in a time which is equivalent to the thermal characteristics of element 11 and also by an amount and in a time equivalent to its own thermal characteristics, as element 12. This thermostatic member cooperates at its free end with a stationary contact 16 which is adjustable, for purposes to be described hereinafter. The flexing of member 15 into engagement with contact 16 operates the tripping circuit of the switch controlling the circuit of the apparatus to be protected. Similarly to the analogy shown in Fig. 1, the free end of thermostatic member 15 is moved a predetermined distance toward contact 16 in a relatively short time interval in response to the direct heating or the thermal characteristics of the member, considered as the element 12 of my device and is, at the same time, moved a predetermined distance toward contact 16 in a relatively long time interval, in response to the thermal conduction of heat generated in mass 13 or corresponding to the thermal characteristics of element 11. The resultant time delay is, therefore, that due to the thermal interaction and combination of the elements 11 and 12.

In the preferred construction of the elements of my device, I provide a hollow core for the heat storage mass 13 within which the heating coil 14 is positioned. In order that the thermostatic member 15 may be connected in series with the heating coil 14 in a compact construction, I utilize the heat storage mass 13 as a conductor of the current from the heating coil 14 to the thermostatic member 15, this mass having no appreciable resistance and consequently no appreciable heating effect. As this current must traverse the thermostatic member 15, I prefer to construct my heat storage mass 13 in two similar portions 17 and 18 mounted in juxtaposition and separated by a layer of insulating material 19, such as asbestos. The thermostatic member 15, is therefore, made in a substantially V-shaped configuration with the two ends of the V mounted on and in thermal relation to, the two portions 17 and 18 of the heat storage mass 13. In order to provide a large thermal storage volume with the smallest mass, I prefer to use for the mass 13, a material of high specific heat, such as aluminum or its alloys thus not only obtaining a small and convenient size of mass but also one of very little weight.

In Fig. 5, I have shown the elements of my thermal protective device and their connection in the circuit of an apparatus to be protected. In this figure, the machine 35 to be protected is shown connected by conductors 20 and 21 to the mains 22 and 23 through a circuit opening device or circuit breaker 24. The breaker 24 is of the automatic type and, in the particular form shown, is adapted to be opened by the energization of a trip coil 25. As shown in Fig. 5, the engagement of member 15 and contact 16 closes a circuit from one side of the line, for instance, conductor 20, through conductor 32, to trip coil 25, and thence to terminal 33 of my device, to contact 16, and thence through thermostatic member 15 to portion 18, thence to terminal 26 of my device, to conductor 21 of the other side of the line. Other forms of breakers may be used in which automatic operation is effected by the deenergization of a coil, such as a low voltage release. The deenergization of a control circuit, requires the thermostatic member 15 and contact 16 to be normally in engagement and separated by the flexing of the member. This can be easily accomplished by simply reversing the member 15 at its connections to the heat storage portions 17 and 18 and then positioning contact 16 to normally engage the same.

As has been described relative to the elements of Fig. 1, to duplicate any thermal characteristic curve between the limits defined, it is only necessary to vary either one or both the resistances of the heating coils for the elements. Similarly by a variation of the ratio of the resistances of the heating means for elements 11 and 12, I am able to duplicate any thermal characteristic curve between the limits set forth. For element 11, this can readily be obtained by a variation of the resistance of heating element 14. In reference to element 12, however, it is necessary that any variation made in the resistance of thermostatic member 15 does not substantially vary the thermal storage volume of this member. To vary the resistance of member 15, I prefer, therefore, to vary the width of the member 15 which does not materially vary its ratio of mass to radiating surface.

When a proper ratio of heating elements has been obtained to duplicate the desired characteristic curve, the capacity or rating of the device may be changed by a change in the combined resistance of the two heating elements while still maintaining the predetermined ratio.

For the connection of my protective device in the circuit of machine 35, two terminals 26 and 27 are provided. The current from conductor 21 enters one terminal 26 of my device and then passes thru the heating coil 14. As the other end of the heating coil is electrically connected to the portion 17 of the heat storage mass 13, as best shown in Fig. 4, the current on leaving the heating coil 14 enters portion 17 of the mass 13 and then passes thru the thermostatic member 15 to the other portion 18 of the mass 13, the thermostatic member 15 being both electrically and thermally connected to both heat storage portions 17 and 18.

From the portion 18 of the mass 13, the current leaves the device through terminal 27 which is connected thereto and passes on through the conductor 20 to the machine 35. The heating coil 14 and thermostatic member 15 are thus in series with each other and in series with the circuit of the machine to be protected, and are thereby subjected to the same current conditions which affect the machine protected. For small machines, the coil 14 and member 15 can be directly connected in the circuit of the machine whereas on large machines, the coil and member will be preferably connected through a transformer or a current shunt, so that the coil and member will be responsive to a proportional part of the current traversing the machine.

It will be seen that for any overload on the protected apparatus which the apparatus can safely stand for an appreciable interval of time without injury, the temperature of the storage mass is the principal controlling influence and the thermostat 15 under these conditions will be operated principally, although not entirely in accordance with the temperature of the storage mass and thus in accordance with the hot spot temperature of the metallic parts of the protected apparatus with which the windings or conductors of the protected apparatus are thermally related. However, if the overload on the protected apparatus is comparatively large and of such a nature that if continued for over a predetermined comparatively short interval of time the insulation surrounding the conductors of the protected apparatus would likely be injured, the heat generated in the thermostat 15 is the principal controlling influence so that the circuit of the protected apparatus will be opened substantially independently of the temperature of the storage mass 13. Thus, the operation of the thermostat is principally in accordance with the heat stored in the storage mass 13 and substantially independent of the momentary value of the current through the heating coil 14 for all overloads which may safely be endured for an appreciable interval of time, but if the overload exceeds such a value, the operation of the thermostat will be principally in accordance with the value of the current which traverses the heating coil 14, even though the temperature of the storage mass at the moment may be comparatively low. Of course, it is to be understood that the operation of the thermostat 15 is a resultant of the heating effect of the storage mass and the heat generated in itself acting as a heating element. Nevertheless, because of the fact that the thermostat has a comparatively short time lag, if the current through the heating coil 14 is a certain high value for a certain time interval, the operation of the thermostat will be principally in accordance with the heat generated in itself and thus substantially independent of the temperature of the storage mass at the moment. Thus, although, the thermostat may assume a position due to the combined influence of the temperature of the storage mass and the heat generated in the thermostat, if a heavy overload occurs, the final movement of the thermostat will be almost entirely due to the heat generated in the thermostat by the current through the thermostat.

As described relative to Fig. 1, my device is calibrated by positioning the adjustable contact 16 so that the thermostatic member 15 will just engage contact 16 at a temperature of 90° C. At 40° C. ambient temperature, the contacts are a certain distance apart and at lower ambient temperatures are a proportionately greater distance apart due to the flexing of the thermostatic member away from contact 16. This is a very desirable characteristic, as the lower the ambient temperature, the greater the distance the member 15 will have to travel to engage contact 16 and, therefore, the greater the load value and the longer the time interval required. Thus my protective device is automatically duplicating the conditions which occur in the machine to be protected. The lower the ambient temperature of the machine, the greater the loads that can be carried before the machine reaches critical temperature. In addition, on all loads sufficient to cause operation of the device, the length of time delay will be proportionally increased. In order that the ambient temperature may affect the protective device in the same manner as it affects the machine, it is necessary that the temperatures in the protective device be not only proportional but equal to the temperatures found in the machine. This feature of varying ambient temperature is taken care of automatically in my device so that irrespective of what the ambient temperature may be, my protective device will always permit the machine to operate until critical temperature is reached, therefore, always obtaining from the machine its maximum permissible output. With an ambient temperature of 90° C. which corresponds also to the critical temperature, the machine cannot be operated at all, as my protective device will have closed its contacts and opened the switch.

Since the load which can be imposed on an electrical apparatus is largely limited by the character of the insulation, electrical apparatus of various sorts has critical temperatures varying from 80° C to 125° C. The protective device, of my preferred form, is arranged with the stationary contact adjustable so that the critical temperature at which the device operates can be varied to meet the requirements of the individual apparatus. To provide this function, I provide the contact member 16 with means for adjusting its distance from the cooperating contact element or thermostatic member 15 depending on the critical temperature which the machine will withstand. This construction is shown in detail in Fig.

6 in which the contact member 16 is threaded into a support 28 and is movably positioned by means of an insulating collar 29. Secured by a set screw to the screw threaded portion of the contact member 16, is an indicator 30 cooperating with an index plate 31 upon which is noted in degrees centigrade, critical temperature values, which in the particular device shown, ranges from 80° to 90° C. Electrically connected to plate 31 is a terminal 33 for my device, which serves as a connection to the trip coil 25, and it is apparent that the tripping current in entering terminal 33, passes to contact 16 through index plate 31, support 28 and the screw threaded portion of contact 16. At a critical temperature of 90° C. the contact 16 is positioned to just engage the thermostatic member 15 and the indicator 30 is adjusted to register with the 90° C. mark on the index plate 31. If the critical temperature of a machine to be protected is 80° C., to suitably protect the machine, the contact 16 is moved until the indicator registers 80° C. thus, requiring the themostatic member 15 to travel a shorter distance in order to engage contact 16 and cut off the machine at 80° C.

For purposes of thermal efficiency and mechanical consideration of protection and convenience, I prefer to mount the elements of my device in a suitable enclosing structure or casing which, in the preferred construction, comprises a base 36 upon which is mounted a suitable cover, not shown for purposes of clearness. This cover is adapted to be easily removable and is held in place by the supports 37 extending through the cover and by suitable fastening means threaded thereon. This casing serves to stabilize the rate of radiation by protecting the thermal elements from erratic radiation not dependent upon ambient temperature. It will be understood that, as shown in Fig. 5, the thermal protective device in accordance with the invention may be located remotely from the apparatus to be protected so that the device is out of the direct influence of the heat radiated from the protected apparatus.

It is thus apparent from the foregoing description that I have provided a protective device in which the cooperating thermal elements may be varied in proportional effectiveness so as to duplicate the thermal characteristic curve of any electrical apparatus to be protected over the entire range of loads to which it may be subjected; in which ambient temperature is taken into account in determining the load which an apparatus can safely carry; and in which my device is readily adjustable to properly protect apparatus designed for different critical temperatures.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A protective device for electrical apparatus having different thermal characteristics in its component parts comprising means for causing the opening of the circuit of said apparatus under all conditions and values of load when the temperature of one of the said parts of said apparatus individually reaches a predetermined critical value, and means for varying the critical temperature at which said first mentioned means is operative.

2. A protective device for electrical apparatus having different thermal characteristics in selected component parts of the same comprising means adapted to be located remotely from the apparatus so as to be out of the direct influence of the heat radiated from the apparatus for duplicating the thermal characteristics of the said parts of the said apparatus, and means controlled by said first mentioned means for opening the circuit of said apparatus when any predetermined temperature is individually reached by any one of the selected parts of the said apparatus.

3. A protective device for electrical apparatus having different thermal characteristics in its component parts, comprising means for duplicating the time interval required for said parts of the apparatus to individually reach any critical temperature.

4. A protective device for electrical apparatus, comprising cooperating metallic elements adapted to be located remotely from the apparatus so as to be out of the direct influence of the heat radiated from the apparatus for duplicating the time interval required for the frame and the conductors of said apparatus to individually reach any predetermined temperature, and means controlled by said elements for opening the circuit of said apparatus when said predetermined temperature is individually reached by the frame of said apparatus or by the conductors thereof.

5. A protective device for electrical apparatus, comprising means for duplicating the hot spot temperature of the frame and the conductors of said apparatus under all conditions and values of load, and means controlled by said first mentioned means for opening the circuit of said apparatus when said hot spot of the frame or the conductors of the apparatus reaches any predetermined temperature.

6. A protective device for electrical apparatus having different thermal characteristics in its component parts, comprising means adapted to be located remotely from the apparatus so as to be out of the direct influence of the heat radiated from the apparatus and responsive to the load current traversing said apparatus or a proportional part of such current for duplicating the different thermal characteristics of the parts of said apparatus, and means controlled by said first mentioned means for opening the circuit of said apparatus when any predetermined temperature is individually first reached in one of the parts of said apparatus.

7. A protective device for electrical apparatus, said apparatus having metallic parts and an electric conductor or conductors thermally related to the metallic parts. the said device comprising cooperating metallic elements proportioned to produce a resultant thermal characteristic which substantially duplicates the thermal characteristic of the protected apparatus, one of said elements comprising a heat storage mass of metal and electric heating means which heats the mass in accordance with the heating of the said metallic parts of the protected apparatus, and another of said elements comprising a circuit controlling thermal responsive device which is thermally related to the said storage mass to be heated thereby and which is also heated directly in accordance with the current in the conductor or conductors of the protected apparatus to produce the said resultant thermal characteristic.

8. In a protective device for controlling electrical apparatus, remotely from the apparatus, the combination with two thermally responsive elements cooperating to produce a resultant time delay which duplicates that required for the hot spot of said apparatus to reach a predetermined temperature, and means controlled thereby to open the circuit of said apparatus when said predetermined temperature is reached.

9. A protective device for electrical apparatus said apparatus having component parts including a metallic structure and an electric conductor or conductors thermally interrelated, the said device comprising two metallic elements having thermal characteristics differing from each other and corresponding to the respective thermal characteristics of the component parts of the protected apparatus, the said elements being thermally interrelated to produce in one of the elements a resultant thermal characteristic which substantially duplicates the resultant thermal characteristic of the said component parts of the apparatus, the other of said elements having an electrical heating means for heating this element to a temperature bearing a predetermined relation to the temperature of the said structure of the protected apparatus, and the first mentioned element arranged to control the circuit of the protected apparatus and to be traversed by the load current of the protected apparatus or a current proportional thereto to generate heat corresponding to the heat generated by the current in the conductor or conductors of the protected apparatus, and thus by the thermal interrelation thereof with the said other element cause the said first mentioned element to have a temperature bearing a predetermined relation to the hot spot temperature of the protected apparatus.

10. In a protective device, the combination with two cooperating elements, one of said elements having a long time delay corresponding to the heating in the frame of an electrical apparatus to be protected, the other element having a shorter time delay corresponding to the heating in the conductors of said apparatus, the effect of said shorter time delay element increasingly predominating on load conditions causing excessive heating.

11. A thermal protective device for electrical apparatus comprising two metallic elements cooperating to control the circuit of the protected apparatus and having different thermal characteristics thermally interrelated and proportioned to produce a resultant thermal characteristic, which substantially duplicates the thermal characteristic of the protected apparatus.

12. A protective device for electrical apparatus comprising two metallic elements having respectively widely different time delays, said elements being thermally interrelated to produce in one of said elements a resultant time delay which will depend upon the proportional effect of each element.

13. In a device for duplicating the thermal characteristics of an electrical apparatus, the combination with an element requiring a longer time interval than that required for said apparatus to reach a predetermined temperature, and an element requiring a shorter time interval than that required for said apparatus to reach said predetermined temperature, said elements being associated to give a resultant time delay which varies as the proportional effect of said elements.

14. A protective device for electrical apparatus comprising two thermally interrelated elements transversed by the load current in said apparatus or a proportional part of said current and cooperating to produce a resultant thermal characteristic duplicating the thermal characteristic of said apparatus, each of said elements having its own thermal characteristic and so interrelated that the effect of one element predominates on overload conditions above a certain amount.

15. In a protective device the combination with two mutually cooperating elements, a common means responsive to both of said elements, circuit opening means for the apparatus to be protected controlled by said common means, one of said elements predominating under excessive load conditions to effect the operation of said common means.

16. In combination with means for duplicating the thermal characteristics of an electrical apparatus having different thermal characteristics in selected component parts thereof, of means for opening the circuit of said apparatus in response to said means when the hot spot of said apparatus first reaches a critical temperature in any one of the selected parts of the apparatus, and adjustable means to enable the opening of said circuit on any critical temperature.

17. A protective device for electrical apparatus having different thermal characteristics in its component parts comprising means adapted to be located remotely from the apparatus so as to be out of the direct influence of the heat radiated from the apparatus for duplicating the time interval required for said parts of the apparatus to individually or jointly reach a predetermined temperature under all conditions and values of load and from any ambient temperature.

18. A protective device for electrical apparatus having different thermal characteristics in its selected component parts comprising thermal means adapted to be located remotely from the apparatus so as to be out of the direct influence of the heat radiated from the apparatus for always duplicating the individual thermal characteristics of the said parts of said apparatus under all conditions and values of load, and means controlled by said thermal means for opening the circuit of said apparatus when any predetermined temperature is reached by any selected part.

19. In a thermal protective device, the combination with a thermal element comprising a heating means, a heat storage mass thermally related thereto, and a thermostatic member responsive both to the temperature of said mass by thermal conduction and to the temperature created within itself by current traversing the same.

20. In a thermal protective device, an element comprising a temperature responsive means having a thermal characteristic, said means being heated by current traversing the same, a second element including said temperature responsive means in thermal conductive relation, said second element having a different thermal characteristic, said temperature responsive means being controlled thereby to produce a resultant thermal characteristic.

21. In a thermal protective device, the combination with a thermal element having a long time lag comprising a heat storage mass, heating means therefor, and a temperature responsive means in thermal conductive relation with said mass, said temperature responsive means being traversed by the current traversing said heating means to form by itself a cooperating thermal element having a short time lag.

22. In a thermal protective device for electrical apparatus, the combination with a circuit controlling thermostatic member traversed by current to indicate its own temperature by the direct heating of its mass and forming thereby a thermal element having a short time lag, a cooperating thermal element having a longer time lag comprising a heat storage mass in thermal conductive relation with said thermostatic member, and a heating means for said mass energized responsively to the current taken by the apparatus to be protected.

23. In a protective device, the combination with two elements mutually cooperating in thermal relation, a common temperature responsive means movable as the resultant of the effects of said elements, one of said elements predominating under excessive load conditions to increasingly effect the time of operation of said temperature responsive means.

24. In a thermal protective device for electrical apparatus, the combination with a metallic hollow core which serves as a heat storage mass, a heating element positioned within the same core and thermally associated therewith, and a circuit controlling temperature indicating means in thermal conductive relation to said storage mass and in series with said heating element to be heated by the said mass and also directly in accordance with the current through the heating element.

25. A protective device for electrical apparatus comprising a heat storage mass of metal which is heated to a certain temperature in the same time as that required by the frame of the apparatus to reach a predetermined critical temperature and a thermostatic member thermally related to the said mass and also heated directly in accordance with the current passing through said apparatus for opening the circuit of said apparatus under all conditions and values of load when the temperature of said apparatus reaches its critical value.

26. A protective device for electrical apparatus comprising an electric heating element through which a current of a value bearing a predetermined ratio to the current in the apparatus is adapted to pass, a mass of metal heated thereby having similar heat storage and heat emission characteristics to those of the said apparatus, and a thermostatic element thermally related with the said mass for controlling the said apparatus to protect from conditions causing overheating.

27. A protective device for electrical apparatus comprising an electric heating element through which a current of a value bearing a predetermined ratio to the current in the apparatus is adapted to pass, a mass of metal heated thereby, the heating element and mass having similar thermal characteristics to the thermal characteristics of corresponding parts of the apparatus, and a thermal-responsive element in thermal conductive relation to the mass for controlling the apparatus to protect from conditions causing overheating.

28. A protective device for electrical apparatus comprising a heat storage mass of metal which is heated to a certain temperature in the same time as that required for the apparatus to reach a predetermined critical temperature, and a thermal-responsive element thermally related with the mass and operated thereby responsively to the temperature of the mass for controlling the apparatus to protect the same from conditions causing overheating.

29. A thermal-responsive circuit-controller comprising a heating element, a heat storage mass heated thereby, a circuit controlling contact, and means whereby the said contact is operated jointly under the control of two forces responsively to the current through the heating element, one of said forces being dependent upon the temperature of the said mass and the other of said forces being substantially independent thereof.

30. A thermal-responsive circuit-controller comprising a heating element, a heat storage mass thermally related therewith, and a circuit controlling contact operated in response both to the thermal condition of the storage mass and to the value of the current in the said heating element.

31. A thermal-responsive circuit-controller comprising a heat storage mass, a circuit controlling contact, and means whereby the said contact is operated responsively to the thermal condition of the said mass when the mass is heated slowly and is operated substantially independently of the thermal condition of the said mass when heat is applied to the mass at a greater rate.

32. A thermal-responsive circuit controller comprising a heating element, a heat storage mass thermally related therewith, and a circuit controlling contact operated in response to the thermal condition of the said mass when the current through the heating element is one value and in response to the current through the heating element when the current is another value.

33. A thermal-responsive circuit-controller comprising a heating element, a heat storage mass thermally related therewith, a circuit controlling contact, and means whereby the said contact is automatically operated responsively to the thermal condition of the mass under certain conditions and is automatically operated substantially independently of the thermal condition of the said mass responsively to the value of the current in the heating element under other conditions.

34. A protective device for electrical apparatus comprising a heat storage mass which is heated to a certain temperature in the same time as that required for the said apparatus to reach a predetermined critical temperature, a circuit controlling contact element for controlling the said apparatus, and means whereby the said element is operated responsively to the thermal condition of the said mass under certain conditions and is operated substantially independently of the thermal condition of the mass under other conditions.

35. A protective device for electrical apparatus comprising an electric heating element through which a current of a value bearing a predetermined ratio to the current in the said apparatus is adapted to pass, a heat storage mass heated thereby, a circuit controlling contact element for controlling the said apparatus, and means whereby the said element is controlled responsively to the thermal condition of the said mass under certain conditions and is controlled substantially independently of the thermal condition of the mass under other conditions.

36. A protective device for electrical apparatus comprising an electric heating element having similar heat generating characteristics to those of the said apparatus, a mass heated thereby having similar heat storage and heat emission characteristics to those of said apparatus, a circuit controlling element for controlling the said apparatus, and means whereby the said element is operated under the control of the thermal condition of the said mass under certain conditions and is operated substantially independently of the thermal condition of the mass under other conditions.

37. A protective device for electrical apparatus comprising a heat storage mass which is heated to a certain temperature in the same time as that required for the said apparatus to reach a predetermined critical temperature, a circuit controlling contact element for controlling the said apparatus, and means whereby the said element is operated responsively to the temperature of the mass when the mass is heated slowly and is operated substantially independently of the temperature of the mass when heat is applied to the mass at a greater rate.

38. A protective device for electrical apparatus comprising a heat storage mass which is heated to a certain temperature in the same time as that required for the said apparatus to reach a predetermined critical temperature, a circuit controlling contact element for controlling the said apparatus, and means having substantially different thermal characteristics than those of the said mass and in thermal conductive relation therewith for operating the said element responsively to the thermal condition of the mass when the mass is heated slowly and for operating the element substantially independently of the temperature of the mass when heat is applied to the mass at a greater rate.

39. A protective device for electrical apparatus comprising a heat storage mass which is heated to a certain temperature in the same time as that required for the said apparatus to reach a predetermined critical temperature, a heating element for the said mass, a circuit controlling contact element for controlling the said apparatus, and means whereby the said element is operated responsively to the temperature of the said mass when the average value of current through the said heating element for a certain time interval is less than a predetermined value, and is operated substantially independently of the temperature of the mass when the current through the heating element is greater than a predetermined value.

40. A protective device for electrical apparatus comprising an electric heating element having similar heat generating characteristics to those of the said apparatus, a mass heated thereby having similar heat storage and heat emission characteristics to those of said apparatus, a circuit controlling element for controlling the said apparatus, and means whereby the said element is operated responsively to the temperature of the said mass when the current through the heating element is less than a certain value for a certain time interval, and is operated quickly responsively to the current through the heating element, substantially independently of the temperature of the mass when the value of the current is greater than the said certain value.

41. A protective device for electrical apparatus comprising an electric heating element through which a current of a value bearing a predetermined ratio to the current in the said apparatus is adapted to pass, and two cooperating elements for controlling the said apparatus, the first of said elements being under the control of the heating element, and the second of said elements being under the control of the first element when the current through the heating element is less than a certain value and substantially under the control of the current through the heating element alone when the said current is greater than a certain value.

42. A protective device for electrical apparatus comprising an electric heating element through which a current of a value bearing a predetermined ratio to the current in the said apparatus is adapted to pass, and two cooperating elements which operate jointly under the control of the heating element to control the said apparatus when the current through the heating element is less than a certain value, one of said cooperating elements arranged to operate substantially independently of the other element to control the said apparatus when the current through the heating element is greater than the certain value.

43. A protective device for electrical apparatus comprising an electric heating element through which a current of a value bearing a predetermined ratio to the current in the said apparatus is adapted to pass, and two cooperating elements for controlling the said apparatus, one of said elements comprising a heat storage mass heated by the said electric heating element, and the other of said elements movable under the control of the temperature of the mass after a time interval when the current through the heating element is one value and movable in a shorter time interval substantially independently of the temperature of the mass when the current through the heating element is another value.

44. A protective device for an electric circuit containing electrical apparatus comprising a heating element, a heat storage element, and a thermal responsive element, said three elements being so proportioned and arranged that the thermal responsive device is at all times subjected to the temperature obtaining in a selected portion of the apparatus.

45. A protective device for an electric circuit containing electrical apparatus, comprising a heat storage element, a heating element in said circuit in thermal communication with said heat storage element, the mass of the heat storage element being such that its temperature varies slowly with temperature changes of the heating element and a thermal responsive device in said circuit in thermal communication with the heat storage element, the mass of the thermal responsive device being such that its temperature increases substantially concurrently with an increase in current flow.

46. A protective device for an electric circuit containing electrical apparatus comprising a heating coil in said circuit, a metallic element having a large heat storage capacity in thermal communication with said coil, and a thermal responsive heating element having a small heat storage capacity arranged in said circuit in thermal communication with said metallic element.

47. A protective device for an electric circuit containing electrical apparatus comprising two thermally connected elements adapted to be heated by current flow, one of said elements having a long time temperature lag and the other having a short time temperature lag, and means operative by an increase in temperature of the latter element to a predetermined temperature, to open the circuit.

48. A thermal relay for electrical apparatus having metallic parts and a conductor or conductors thermally related to the metallic parts, comprising a heating element which is energized in accordance with the current through the conductor or conductors of the protected apparatus, a mass of metal in thermal relation thereto, a movable thermal responsive device which is arranged to be heated and moved directly in accordance with the current through the said heating element and in accordance with the temperature of the said mass, the heating effect of the mass predominating to effect movement of the thermal device when the average value of the current through the heating element is less than a predetermined value for a predetermined interval of time and the direct heating effect of the current through the heating element predominating to effect movement of the device when the average value of the current is greater than a predetermined value for a predetermined time interval, relatively movable circuit controlling contacts controlled by the said device, and means for adjusting the relative movement of the said contacts for adjusting the relay to operate when the protected apparatus reaches any predetermined temperature.

In witness whereof, I have hereunto set my hand this 26 day of Nov., 1919.

CHESTER I. HALL